Feb. 14, 1956

E. O. NORRIS 2,734,480

CENTRIFUGAL SPRAY COATING APPARATUS

Filed May 14, 1952

INVENTOR
EDWARD O. NORRIS
BY
ATTORNEY

Feb. 14, 1956 E. O. NORRIS 2,734,480
CENTRIFUGAL SPRAY COATING APPARATUS
Filed May 14, 1952 7 Sheets-Sheet 2

Fig 2

INVENTOR
EDWARD O. NORRIS
BY

ATTORNEY

Feb. 14, 1956 E. O. NORRIS 2,734,480
CENTRIFUGAL SPRAY COATING APPARATUS
Filed May 14, 1952 7 Sheets-Sheet 3

INVENTOR
EDWARD O. NORRIS
BY
ATTORNEY

Feb. 14, 1956 E. O. NORRIS 2,734,480
CENTRIFUGAL SPRAY COATING APPARATUS
Filed May 14, 1952 7 Sheets-Sheet 5

INVENTOR
EDWARD O. NORRIS
BY
ATTORNEY

Feb. 14, 1956  E. O. NORRIS  2,734,480
CENTRIFUGAL SPRAY COATING APPARATUS
Filed May 14, 1952  7 Sheets-Sheet 7

INVENTOR
EDWARD O. NORRIS
BY
ATTORNEY

United States Patent Office 2,734,480
Patented Feb. 14, 1956

2,734,480

CENTRIFUGAL SPRAY COATING APPARATUS

Edward O. Norris, Westport, Conn.

Application May 14, 1952, Serial No. 287,790

2 Claims. (Cl. 118—326)

This invention relates to apparatus for centrifugally spraying objects which are capable of being fed into a spray zone, and it has for an object to provide a novel and improved apparatus for this purpose.

Another object of the invention is to provide a centrifugal spraying apparatus having means for producing a zone of atomized spray material combined with a directional spray.

Another object is to provide a spraying apparatus of the type specified having means for accurately regulating the volume and consistency of the atomized spray material in accordance with the requirements of the work to be processed.

Still another object is to provide means for maintaining a vapor pressure equilibrium in the spray zone of a centrifugal sprayer of the foregoing type so as to insure constant material viscosity and concentration.

Another object of the invention is to provide a centrifugal spraying apparatus with means to maintain suitable solvent vapor and temperature conditions in the atmosphere of the spray zone.

Another object is to provide means to capture and collect the sprayed material which is not intercepted by the surface of the objects being sprayed, so that this material becomes available for respraying.

Another object is to provide a centrifugal spraying apparatus having novel and improved details of construction and features of operation.

Various other objects and advantages will be apparent as the nature of the invention is more fully disclosed.

In accordance with the present invention, the material to be sprayed is fed to a rotating bowl which is mounted for rotation about a horizontal axis and is driven at a speed suited to maintain a peripheral film of spray material due to centrifugal force. An important novel feature of the invention resides in the provision of an improved pick-up mechanism comprising a rotary centrifugal feeder which dips into the rotating film of spray material in the bowl and is driven thereby at a rate to pick up and discharge said material upon an adjacent rotary centrifugal distributor which is positively driven at the optimum speed to discharge the material as a fine spray entirely within the confines of the enclosure. This fine spray strikes and settles upon the work pieces which pass through the bowl on a suitable conveyor. These rotary feeder-distributor units can be installed in various locations and at varying angles throughout the bowl to attain the desired coverage of irregularly shaped work.

A solvent vapor pressure equilibrium which ensures a constant material viscosity is maintained within the bowl by a novel construction of inlet and outlet chambers and associated elements.

Other important novel features, hereinafter more fully described, include means for feeding spray material onto the rotating film in the bowl in such a way that the incoming material is assimilated into the film without turbulence; means for controlling the thickness of the rotating film of spray material by continuously removing and discharging excess material from the machine; means for adjusting the feeder-distributor unit or units to control the volume and consistency of the spray means for controlling the operating temperatures at various stages of treatment either by heating or cooling according to individual requirements; means for collecting oversprayed material; and various refinements in structural details and features of operation for increasing the efficiency and reliability of operation.

Although the novel features which are characteristic of my invention are set forth more in detail in the claims appended hereto, the nature and scope of the invention may be better understood by referring to the following description taken in connection with the accompanying drawings forming a part thereof, in which certain specific embodiments are set forth for purposes of illustration.

In the following description certain specific terms are used for convenience in referring to the various details of the invention. These terms, however, are to be interpreted as broadly as the state of the art will permit.

Figure 1:
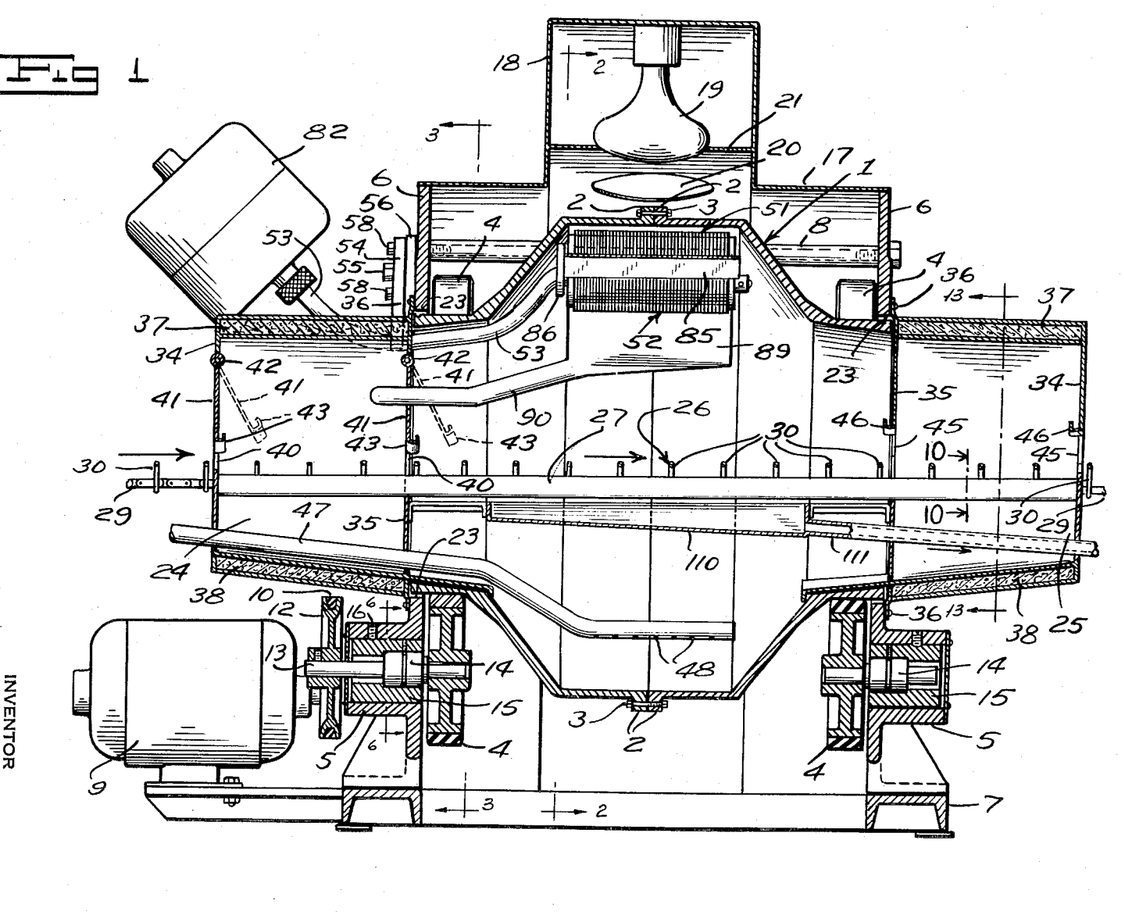
Fig. 1 is a longitudinal vertical section taken on line 1—1 of Fig. 2 through a spraying device embodying the present invention.

The centrifugal spraying machine shown in Fig. 1 comprises a rotatable centrifugal bowl or casing 1 which in this embodiment is made of two identical angular bell-shaped halves having mating peripheral flanges 2 secured together as by bolts 3.

Figure 2:
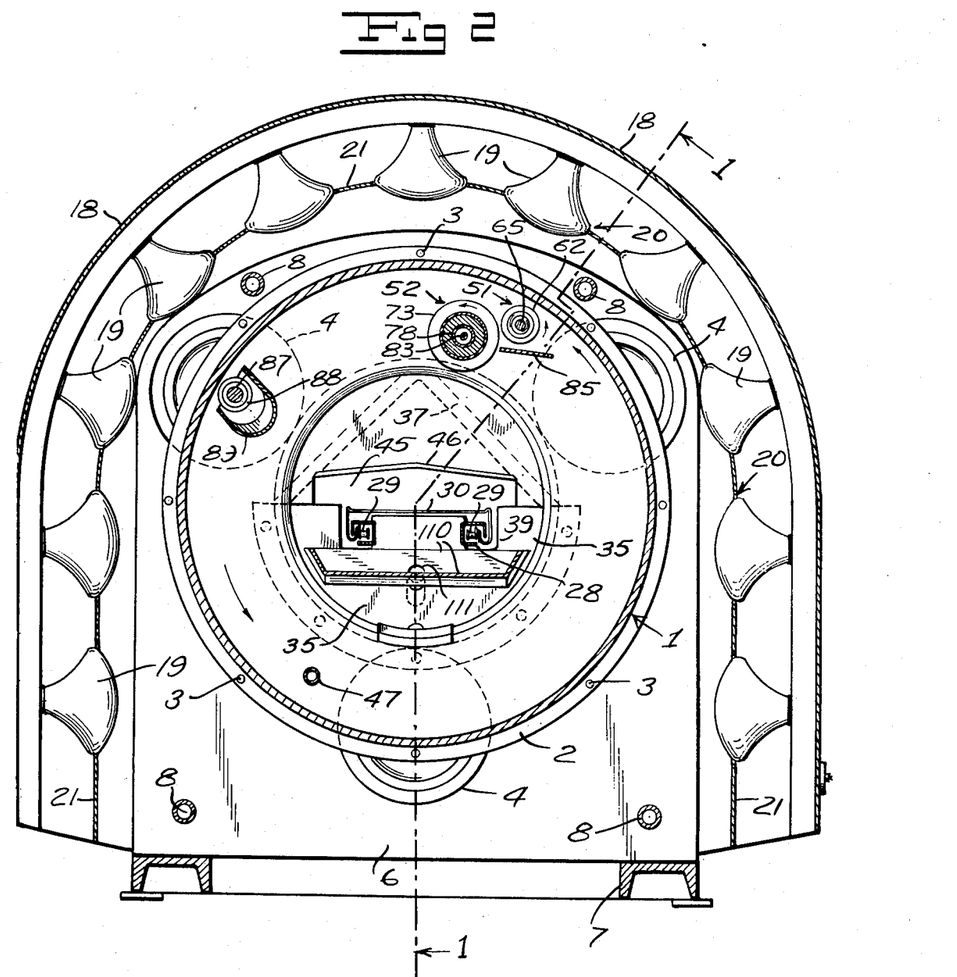
Fig. 2 is a transverse vertical section taken on line 2—2 of Fig. 1.
Figure 3:
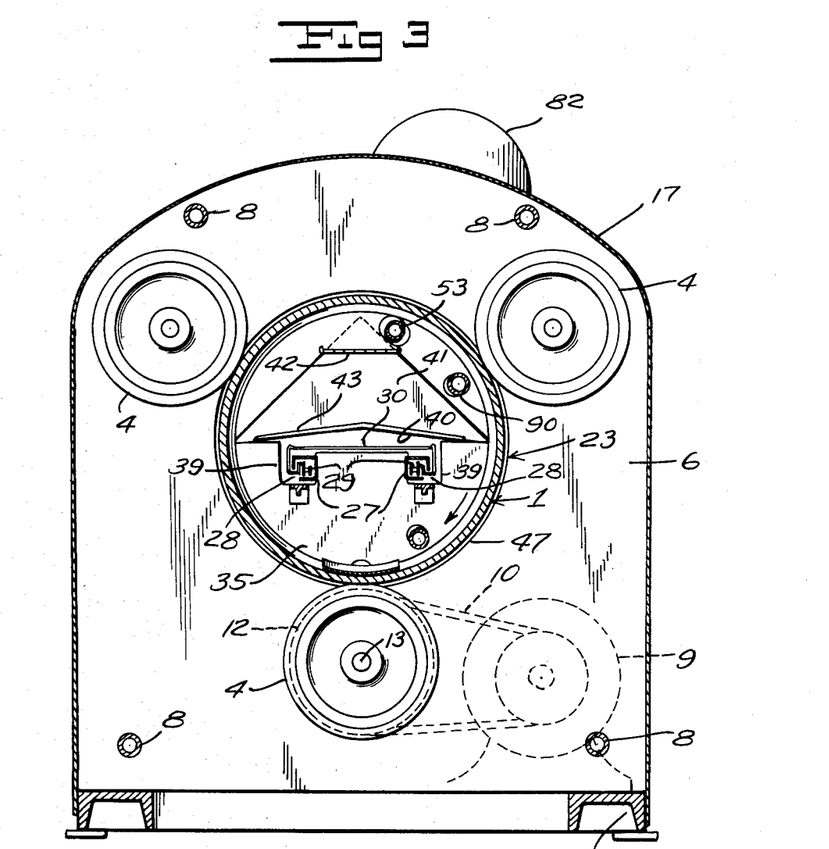
Fig. 3 is a transverse vertical section taken on line 3—3 of Fig. 1.

The bowl 1 is rotatably supported on a plurality of rollers or wheels, for example by thre rubber-tired wheels 4 supporting each annular end hub of the bowl as shown in Figs. 1, 2 and 3. These wheels 4 are journaled in bearing bushings 5 mounted in end plates 6 which are secured to the base 7 and are secured together by longitudinal rods 8.

Figures 4, 5, 6:
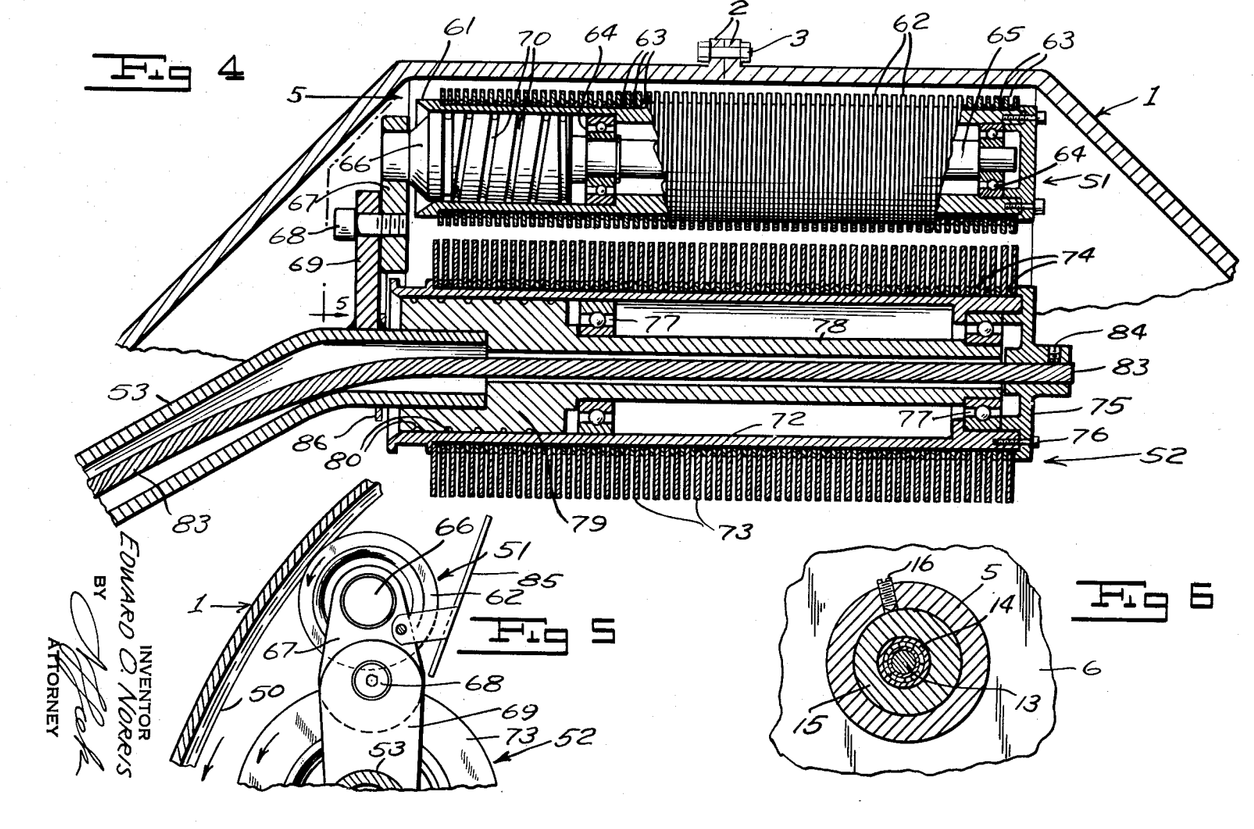
Fig. 4 is a longitudinal section, on an enlarged scale, through the rotary distributor and feeder.
Fig. 5 is a transverse section taken on line 5—5 of Fig. 4.
Fig. 6 is a vertical section on line 6—6 of Fig. 1, showing a detail of the adjustable drive for the rotary bowl.

One of the wheels 4 (that shown at the lower left of Fig. 1) is positively driven by motor 9 through belt 10 driving pulley 12 on shaft 13 which carries said wheel 4; all of the other five wheels being idlers. The shaft 13 is journaled in a bearing 14 mounted eccentrically in a sleeve 15 as shown in Fig. 6; and said sleeve 15 is secured by set screw 16 to the bushing 5 on the said end plate 6 of the machine. Upon loosening the set screw 16 and rotating sleeve 15 in bushing 5, the eccentric mounting of the bearing 14 in sleeve 15 enables the driven wheel 4 to be adjusted with respect to the adjacent end hub of bowl 1 so as to compensate for wear on the rubber tire of said wheel 4. The idler wheels may be similarly mounted for adjustment.

The sides, bottom and top of the machine are enclosed by a wall or casing 17 secured to the end plates 6, as shown in Figs. 1 and 3. In the embodiment illustrated, the casing 17 has an enlarged central hood 18 disposed about the central portion of the rotatable bowl 1 and containing a series of heating lamps 19 which register with spaced openings 20 formed in a partition 21 in said hood for the purpose of heating the bowl 1 when the sprayable material requires heat in order to maintain a desired consistency during the spraying operation.

The annular ends of bowl 1 are aligned with circular openings 23 in the end plates 6 of the machine and stationary members forming inlet and outlet chambers 24 and 25 are secured to the respective end plates 6 in registry with said openings 23. A horizontal conveyor 26, for carrying the objects to be sprayed, extends longitudinally through inlet chamber 24, rotary bowl 1, and outlet chamber 25.

Figure 10:
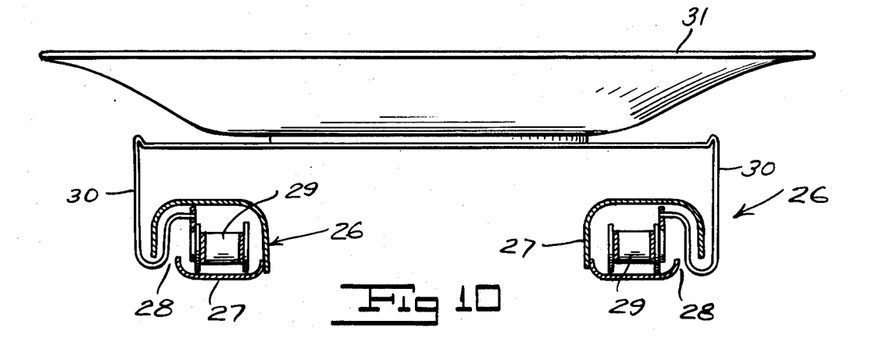
Fig. 10 is a transverse vertical section through the endless conveyor of Fig. 1, showing how articles to be coated (in this instance a dish) are conveyed through the spraying device.
Figure 11:
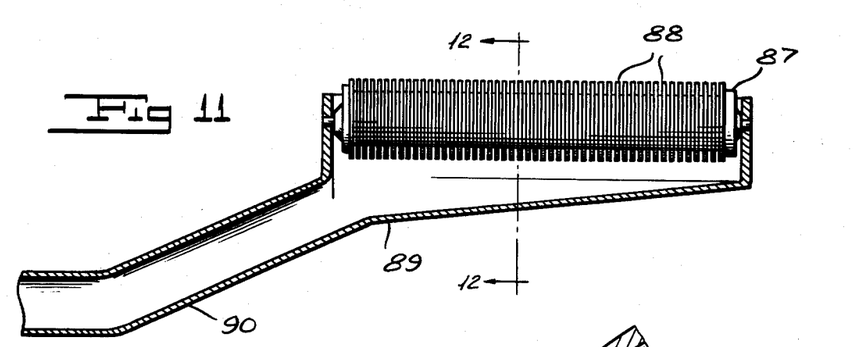
Fig. 11 is a longitudinal vertical section through the drain containing the overflow disc assembly for controlling the thickness of the film of spraying material in the rotary bowl of Fig. 1.
Figure 12:
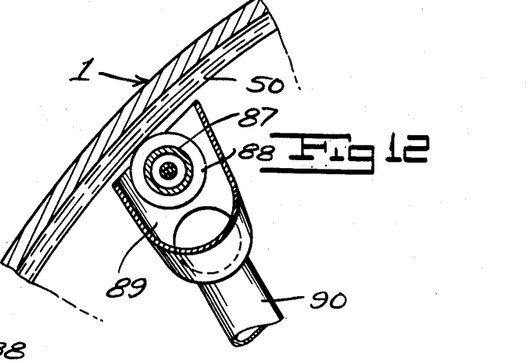
Fig. 12 is a transverse section taken on line 12—12 of Fig. 11.

In the embodiment illustrated, conveyor 26 comprises a pair of spaced stationary hollow tracks or channels 27 which are enclosed except for narrow longitudinal slots or openings 28 which extend the full length of each channel along the lower outer edge thereof, as shown in Fig. 10. Endless link chains 29 track in the channels 27, and various links (such as alternate links) of one chain 29 are joined to corresponding links of the other chain 29 by wire rods 30 which are appropriately bent or formed to extend through the openings 28 in channels 27 and form narrow transverse seats for supporting the articles to be sprayed, such as the dish 31 shown in Fig. 10. During the operation of the machine the endless conveyor is moved continuously by any suitable actuating means (not shown) the movement through the machine being from left to right in Fig. 1. The location and restricted size of the longitudinal openings 28 in channels 27 minimizes the ingress of spray material to said channels.

The inlet and outlet chambers 24 and 25 are constructed to insure an effective vapor seal between said chambers and the rotary bowl 1 where the spraying takes place, the purpose of such seal being to minimize the waste of spray material and maintain a substantially constant vapor consistency. In the embodiment illustrated, chambers 24 and 25 are identical except that inlet chamber 24 has inlet openings which are closed by swinging doors or flaps, while outlet chamber 25 has permanent outlet openings which are restricted according to the size and shape of the objects to be sprayed. Accordingly, corresponding parts of chambers 24 and 25 are identified by the same reference numerals in Figs. 1, 2, 3 and 13. Of course, either or both of the chambers may have fixed walls or either or both may have swinging flaps as desired.

Figure 13:
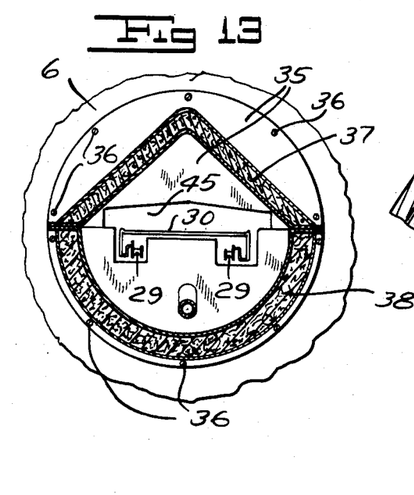
Fig. 13 is a transverse vertical section on line 13—13 of Fig. 1, showing details of the vapor-sealing housing.
Figure 14:
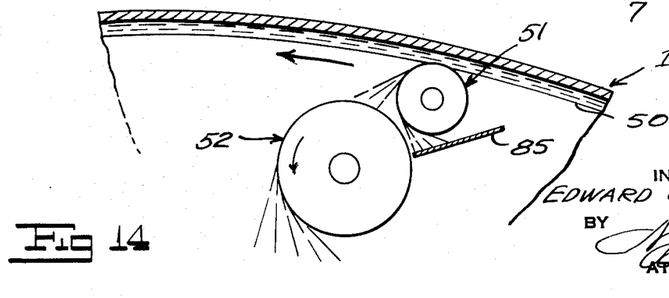
Fig. 14 (on Sheet 3) is a fragmentary transverse vertical section through the rotary bowl, diagrammatically illustrating the pick-off and spraying action of the rotary distributor and feeder assembly.

Inlet and outlet chambers 24 and 25 each have an outer wall 34, an inner wall 35 secured to the adjacent end plate 6 as by screws 36, and hollow jacketed angular top and curved bottom walls 37 and 38, as shown in Figs. 1 and 13. The outer and inner walls 34 and 35 of both chambers 24 and 25 have spaced rectangular openings 39 in which the stationary hollow channels 27 of conveyor 26 are seated and secured, as shown in Figs. 1, 2, 3 and 13.

In the case of inlet chamber 24, the portion of each outer and inner wall 34 and 35 above the openings 39 has a truncated-triangular-shaped opening 40 which is substantially closed by a similarly shaped swinging door or flap 41 hinged to such wall at 42, as shown in Figs. 1 and 3. The hinged flaps 41 of inlet chamber 24 swing inwardly as indicated by the dotted lines in Fig. 1; hence, as the endless conveyor 26 advances from left to right in Fig. 1, conveying the articles to be sprayed (such as dishes 31 of Fig. 10) the pressure of the advancing articles on flaps 41 will swing said flaps about their hinges 42 sufficiently to pass said articles, after which the flaps will immediately return to the closed position shown in full lines in Fig. 1. The lower inner edge of each hinged flap 41 is shaped to form an upturned open channel or lip 43 which slopes downwardly from its central obtuse-angled apex as shown in Figs. 1 and 3 for the purpose of collecting condensed spray material and allowing it to flow onto the downwardly sloping walls of chamber 24 and bowl 1.

In the case of outlet chamber 25, the portion of each outer and inner wall 34 and 35 above the openings 39 has an opening 45 of any suitable shape and size, but preferably only large enough to conveniently pass the articles treated by the spraying machine. For example, in the case of a machine for spraying articles such as the dish 31 of Fig. 10, the elongated low opening 45 of Figs. 2 and 13 is satisfactory. The upper interior edge of said opening 45 is shaped to form an upturned open channel or lip 46 which slopes downwardly from its central obtuse-angled apex as shown in Figs. 1 and 2, for the purpose of collecting spray material and allowing it to flow onto the downwardly sloping walls of chamber 25 and bowl 1 instead of dripping onto the article being processed.

The hollow top and bottom walls 37 and 38 of inlet and outlet chambers 24 and 25 (Figs. 1 and 13) may be supplied with a heating or cooling medium from any suitable supply source (not shown) depending upon the purpose for which the machine is used. For example, in some cases it may be desirable to circulate hot water through one or both of these jacketed walls to assist in controlling the treating temperature. In other cases it may be advantageous to circulate a cooling fluid through one or both of said walls to accelerate the condensation of the spray solvent and prevent the escape thereof. The cooling, however, should be controlled to prevent condensation of atmospheric moisture. The angular top walls 37 of said inlet and outlet chambers 24 and 25 are so constructed (at a suitable angle, preferably in excess of 45°, such as illustrated in Figs. 2 and 13) in order that spray material collecting on these interior sloping walls will flow down said walls into the curved bottom wall, and not drop down vertically and spatter on the objects carried by the conveyor 26.

A pan 110 is shown as disposed beneath the conveyor 26 in a position to collect the oversprayed material that is not intercepted by the work piece or direct spray in the event that no work piece is present. The pan 110 drains through a duct 111 which leads to a receiver, not shown. The pan may be secured to the walls 35 and the duct 111 may extend outwardly through the walls 34 and 35 of the outlet chamber 25. The purpose of the pan 110 is to remove over-sprayed material from the spray zone so that the viscosity of the spray material in the annulus is not built up by loss of solvent. The collected material can of course be re-fed to the bowl after its viscosity has been suitably adjusted.

The rotary centrifugal bowl 1 rotates in a counterclockwise direction as viewed in Fig. 2. The spray material is fed into bowl 1 through a feed pipe 47 which is connected to any suitable source of supply (not shown) and extends through inlet chamber 24 into the bowl where the terminus of the pipe has a plurality of spaced perforations or openings 48 for feeding the spray material onto the central cylindrical portion or annulus of the bowl. The perforated discharge end of feed pipe 47 is mounted adjacent a downwardly-moving point on the bowl (in this instance at about the point where the numeral "7" would appear on a clock). By thus feeding the incoming spray material under pressure onto the downwardly-moving portion of the centrifugal film in bowl 1, the incoming spray material and the moving film have a component of movement in the same direction, with the result that the incoming material is assimilated into the film with less turbulence than would otherwise be possible. The bowl 1 rotates about its horizontal axis at a speed suited to maintain a peripheral film of spray material about the annulus of the bowl due to centrifugal force, as indicated in Figs. 5 and 7 where said peripheral film is designated by the reference numeral 50.

The pick-off mechanism for picking up spray material from the starting film 50, and for discharging same centrifugally in a direction transverse to the axis of bowl 1, comprises a rotary feeder 51 and a rotary distributor 52 which are best shown in Figs. 1 and 4. The feeder 51 is driven by the moving film 50 at a rate to discharge the spray material centrifugally upon the distributor 52, while distributor 52 is positively driven by means hereinafter described at a rate to discharge the spray material centrifugally as a fine spray onto the articles being advanced through the rotary bowl. This novel combination, which will now be described, makes it possible to control the volume and uniformity of distribution of the spray with utmost precision since the feeder 51 is driven by the film 50 at a speed close to the speed of the film and there is thus a minimum of fluid friction and turbulence, while the distributor 52 may be driven at the most efficient speed to produce the desired atomization.

Figure 7:
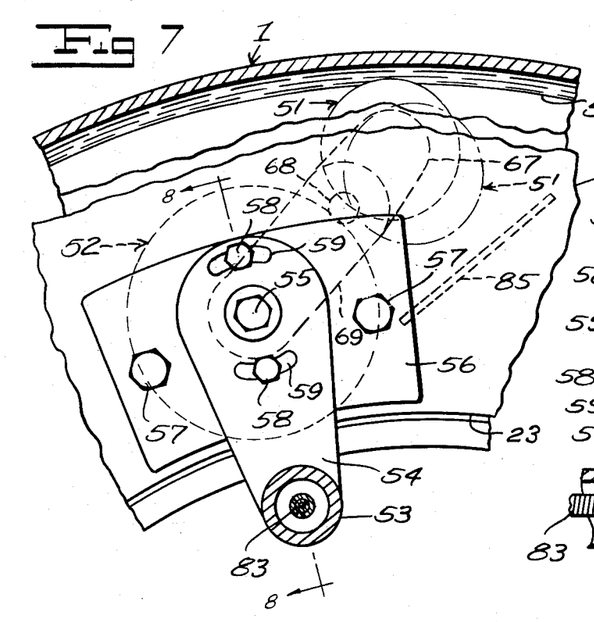
Fig. 7 is a fragmentary vertical section, on an enlarged scale, showing the means for adjusting the position of the rotary feeder.
Figure 8:
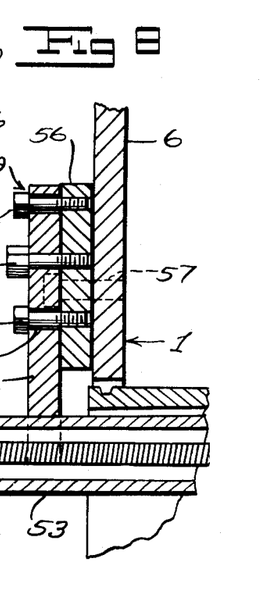
Fig. 8 is a section taken on line 8—8 of Fig. 7.

The rotary feeder 51 and distributor 52 are both mounted on a rigid tube 53 which extends into the bowl 1 and is rigidly secured outside the bowl to an arm 54 swivelled by bolt 55 on a plate 56 (Figs. 7 and 8) which in turn is secured by bolts 57 to the adjacent end plate 6 of the machine, as shown in Figs. 1, 7 and 8. Adjusting bolts 58 in plate 56 extend through arcuate slots 59 in the arm 54 as shown in Figs. 7 and 8. When these bolts are loosened if necessary, the arm 54 may be rotated on its swivel bolt 55 to an extent determined by the length of arcuate slots 59. Such rotation of arm 54 causes rotation of tube 53 which is carried by said arm; and rotation of said tube 53 effects an adjustment in the relative positions of rotary feeder 51 and rotary distributor 52 as hereinafter described.

Referring particularly to Figs. 4 and 5, the rotary feeder 51 comprises a tubular sleeve 61 carrying a longitudinal stack of pick-up discs 62 separated by alternate spacers 63, and rotatable on ball bearings 64 mounted on a shaft 65 having an enlarged end 66 rigidly secured to an arm 67 which, in turn, is secured by bolt 68 to a plate 69 welded or otherwise secured to the tube 53. The enlarged end 66 of shaft 65 is grooved at 70 to exclude atomized spray material from the interior of sleeve 61.

The rotary distributor 52 comprises a positively driven tubular sleeve 72 carrying a longitudinal stack of distributor discs 73 separated by alternate spacers 74 and having an end plate 75 secured to said sleeve 72 by screws 76, as shown in Fig. 4. The sleeve 72 is rotatably mounted on ball bearings 77 carried by hollow stationary shaft 78 having an enlarged end 79 rigidly secured to the end of tube 53. The end 79 of shaft 78 is grooved at 80 to exclude atomized spray material from the interior of sleeve 72. The rotary sleeve 72 carrying distributor discs 73 is driven by motor 82 (Fig. 1) through flexible drive shaft 83 which extends through tube 53 and hollow shaft 78 in sleeve 72 and is secured to the end plate 75 of distributor 52 by set screw 84, as shown in Fig. 4. The axis of the distributor registers with the axis of the bolt 55 so that adjustment of the arm 54 has the effect of rotating the feeder about the axis of the distributor.

A baffle 85, carried by the arm 67 is positioned to intercept material which is discharged from the feeder 51 beyond the arc of the distributor 52, and thus prevents such material from striking the articles on the conveyor 26. The baffle 85 is inclined to drain onto the film in the bowl 1 beyond said articles.

Figure 9:
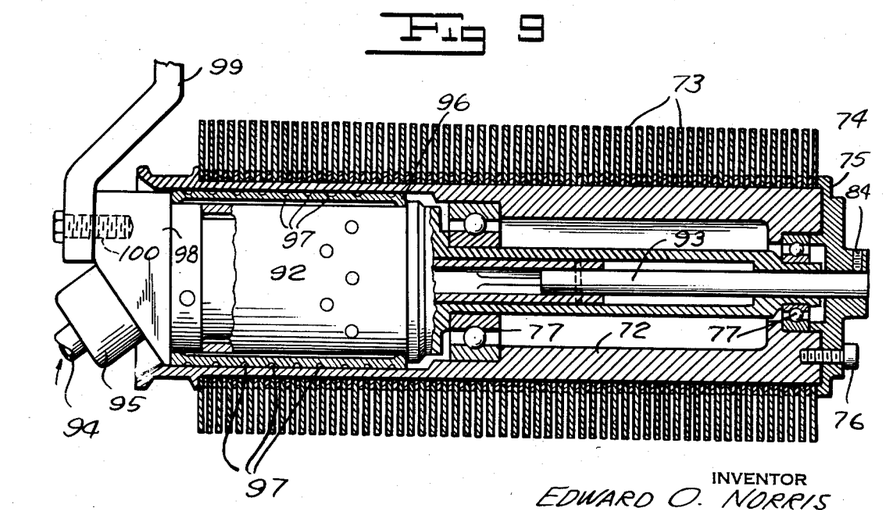
Fig. 9 is a longitudinal vertical section illustrating a modification of the rotary distributor of Fig. 4.

In operation, the spray material is fed into rotary bowl 1 through feed pipe 47 as previously described, and the bowl rotates continuously about its horizontal axis at a speed suited to maintain the peripheral film 50 of spray material (Figs. 5 and 7) by centrifugal force. The discs 62 of rotary feeder 51 dip into the rotating film 50, and, since the feeder is rotated by the film at a speed approximating that of the film, the discs 62 pick up the spray material and discharge it centrifugally upon the distributor 52, as diagrammatically illustrated in Fig. 14. The baffle plate 85 prevents spray material from feeder 51 from passing directly onto the articles. The distributor, being constantly driven by motor 82 at the most efficient speed to produce the desired atomization, discharges the spray material centrifugally as a directional spray and as a fine mist throughout the enclosed area.

Before the machine is set in operation the desired setting of rotary feeder 51 with respect to rotary distributor 52 is effected by loosening bolt 68 (Figs. 4 and 5) and suitably tilting the arm 67 (which carries feeder 51) upon plate 69, after which bolt 68 is tightened. However, when it is desired to adjust feeder 51 while the machine is in operation, in order to move the pick-up discs 62 toward or away from the periphery of bowl 1 and thereby vary the extent to which said discs 62 dip into the rotating film 50 of spray material, this is accomplished in the manner illustrated in Figs. 7 and 8. Upon loosening bolts 55 and 58, if necessary, and rotating the arm 54 which carries tube 53, the resulting rotation of said tube 53 rotates plate 69 and arm 67 carrying rotary feeder 51. The rotary feeder is thus rotated slightly about the axis of the distributor 52, as indicated by the broken lines in Fig. 7, causing the feeder to be adjusted toward or away from the inner periphery of bowl 1 and thus varying the amount of spray material picked up by discs 62 of the feeder.

A drain or discharge device for controlling the thickness of the film of spray material 50 is illustrated in Figs. 1, 2, 11 and 12. This comprises a rotary drum 87 carrying a stack of spaced discs 88 and rotatably mounted in a drain pan 89 rigidly supported by a drain pipe 90 extending into the inlet chamber 24 and connected to any suitable collecting receptacle, not shown. The drain device is located at any suitable point in bowl 1, for example at a downwardly-moving point on the bowl between the rotary feeder-distributor assembly and the feed pipe 47, as shown in Fig. 2. The drain device is mounted so that the discs 88 are spaced a predetermined distance from the cylindrical surface or annulus of bowl 1, according to the desired thickness of the spray material, and, when the rotating film 50 of spray material exceeds the desired depth or thickness, the discs 88 dipping into the film pick up the excess spray material and discharge it centrifugally into drain pan 89 from which it is discharged through drain pipe 90.

The modified rotary distributor illustrated in Fig. 9 is similar to that previously described except that it is actuated by a compressed air motor 92, the drive shaft 93 of which is keyed to the end plate 75 of tubular sleeve 72 by set screw 84. Motor 92 has an air inlet tube 94 and an air vent tube 95, the inlet tube serving to support the distributor within the rotary bowl 1 in the manner previously described in connection with the rigid tube 53 of Fig. 4. The motor has a stationary collar 96 which is spirally grooved at 97 in a direction to exclude spray material from the motor assembly, and the end plate 98 supports a plate or bracket 99 which is secured thereto by bolt 100 and (like the plate 69 of Fig. 4) carries the rotary feeder 51 which is omitted from Fig. 9 in order to simplify the showing. The other parts of the distributor of Fig. 9 are similar to the corresponding parts of the distributor 52 of Fig. 4 and are identified by similar reference numerals for purposes of comparison.

Figure 15:
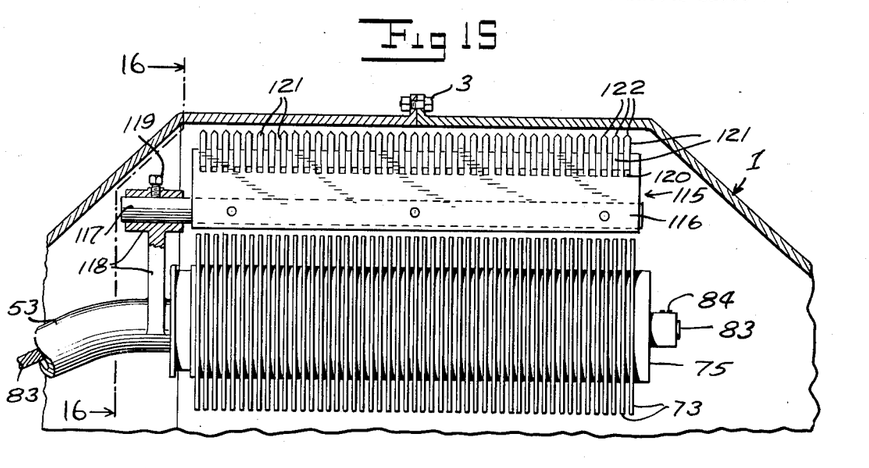
Fig. 15 is a sectional view similar to Fig. 4 illustrating an embodiment using a stationary pick-up.
Figure 16:
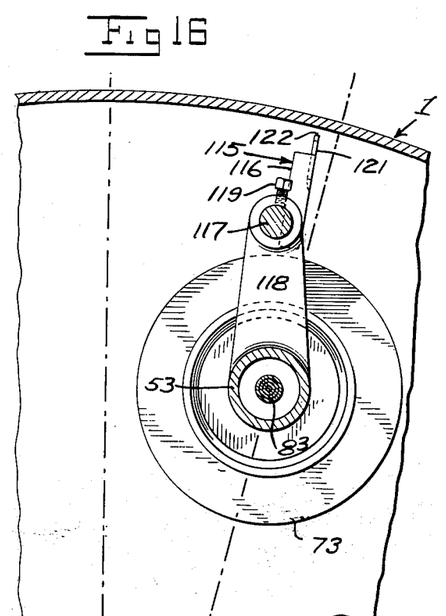
Fig. 16 is a transverse section taken on the line 16—16 of Fig. 15.
Figure 17:
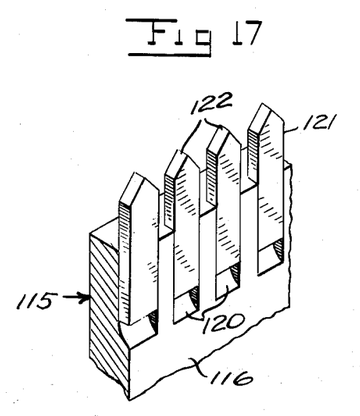
Fig. 17 is a broken perspective view of the pick-off member of Figs. 15 and 16.

Figs. 15–17 illustrate a further embodiment of the invention in which the rotary feeder of Figs. 1–15 is replaced by a stationary feeder 115 in the form of a comb comprising a base member 116 mounted on a bar 117 which is secured in a bracket 118 which is attached to the tube 53 similarly to the arm 69 of Fig. 4. The angular position of the comb can be adjusted by releasing set screw 119. The base member 116 is formed with channels 120 in which teeth 121 are mounted and are secured by suitable means as by welding. The teeth 121 have points 122 which dip into the advancing peripheral film of material in the bowl 1 and deflect a spray of such material onto the distributor 52 which is similar to the distributor 52 of Fig. 4. The teeth 121 are made of a hard metal suited to withstand the abrading action of the spray material. The teeth 121 serve also as mixing means to agitate and mix the material in the bowl 1 and thus prevent stratification due to centrifugal separation. In some cases it has been found advisable to utilize both a rake for mixing and a rotary feeder for feeding the distribution.

The distributor 52, in the various embodiments shown, may be disposed at an angle to the axis of the bowl if desired to effect the proper spray pattern in accordance with the work being processed.

Although certain specific embodiments of the invention have been shown for purposes of illustration, it is to be understood that the invention is capable of various uses and that changes and adaptations may be made therein as will be readily apparent to a person skilled in the art. The invention is only to be restricted in accordance with the scope of the following claims.

What is claimed is:

1. A spraying apparatus comprising a bowl mounted to rotate, said bowl having an opening in at least one end and having an inner surface forming an annulus to retain a spray-forming material, means for rotating said bowl to cause said material to form centrifugally a peripheral film in said bowl, means including fixed top walls mounted outside of said bowl end forming a chamber communicating through said open end with the the interior of said bowl, means to convey articles to be sprayed into and out of said bowl through said chamber, said top walls sloping at an angle of at least 45 degrees and having their entire lower edges disposed beyond the path of said articles to cause collected spray material to flow along the under surface of said walls away from the articles being sprayed, a sprayer positioned to project spray-forming material as a spray to form a spray zone within said bowl adapted to spray articles while in said zone.

2. A spraying apparatus comprising a bowl mounted to rotate, said bowl having an opening in at least one end and having an inner surface forming an annulus to retain a spray-forming material, means for rotating said bowl to cause said material to form centrifugally a peripheral film in said bowl, means including fixed top walls mounted outside of said bowl end forming a chamber communicating through said open end with the interior of said bowl, means to convey articles to be sprayed into and out of said bowl through said chamber, all stationary surfaces above the path of said articles including said top walls sloping at an angle of at least 45 degrees and having their entire lower edges disposed beyond the path of said articles to cause collected spray material to flow along the under surface of said walls away from the articles being sprayed, a sprayer positioned to project spray-forming material as a spray to form a spray zone within said bowl adapted to spray articles while in said zone.

References Cited in the file of this patent

UNITED STATES PATENTS

| 1,964,790 | Roberts | July 3, 1934 |
| 2,553,408 | Foster | May 15, 1941 |
| 2,261,988 | Gaebel | Nov. 11, 1941 |
| 2,375,434 | Moise et al. | May 8, 1945 |
| 2,454,594 | Christensen | Nov. 23, 1948 |
| 2,528,087 | Schoepe | Oct. 31, 1950 |
| 2,587,514 | Norris | Feb. 26, 1952 |
| 2,597,021 | Norris | May 20, 1952 |

FOREIGN PATENTS

| 24,254 | Great Britain | Oct. 19, 1911 |